US011371613B2

(12) United States Patent
Mandou et al.

(10) Patent No.: US 11,371,613 B2
(45) Date of Patent: Jun. 28, 2022

(54) RING SEAL FOR IMPLEMENTING A ROTARY SEAL BETWEEN TWO CYLINDRICAL ELEMENTS

(71) Applicant: AETC SAPPHIRE, Saint Petersburg (RU)

(72) Inventors: Pascal Mandou, Amplepuis (FR); Loic Vincent, Belfort (FR); Lionel Julliand, Belfort (FR)

(73) Assignee: AETC SAPPHIRE, Saint Petersburg (RU)

( * ) Notice: Subject to any disclaimer, the term of this patent is extended or adjusted under 35 U.S.C. 154(b) by 138 days.

(21) Appl. No.: 16/643,140

(22) PCT Filed: Aug. 28, 2018

(86) PCT No.: PCT/EP2018/073130
§ 371 (c)(1),
(2) Date: Feb. 28, 2020

(87) PCT Pub. No.: WO2019/043002
PCT Pub. Date: Mar. 7, 2019

(65) Prior Publication Data
US 2020/0332897 A1    Oct. 22, 2020

(30) Foreign Application Priority Data
Sep. 1, 2017    (FR) ........................... 1758101

(51) Int. Cl.
*F16J 15/3268*    (2016.01)
*B63H 23/32*    (2006.01)
(Continued)

(52) U.S. Cl.
CPC ........ *F16J 15/3268* (2013.01); *B63H 23/321* (2013.01); *F16J 15/3236* (2013.01); *B63H 2023/327* (2013.01); *F16J 15/004* (2013.01)

(58) Field of Classification Search
CPC .. F16J 15/00; F16J 15/004; F16J 15/16; F16J 15/50; F16J 15/52; F16J 15/3268;
(Continued)

(56) References Cited

U.S. PATENT DOCUMENTS 6,688,604 B2     2/2004  Hashimoto
8,567,788 B2 *  10/2013  Bernadat ............... B60T 11/236
                                                                    277/439
(Continued)

FOREIGN PATENT DOCUMENTS

EP         1182133 A1    2/2002
EP         1277978 A1    1/2003
(Continued)

OTHER PUBLICATIONS

International Search Report and the Written Opinion of the International Searching Authority, or the Declaration from International Appl. No. PCT/EP2018/073130, dated Nov. 15, 2018.

*Primary Examiner* — Nathan Cumar
(74) *Attorney, Agent, or Firm* — Wood IP LLC

(57) ABSTRACT

The invention relates to a ring seal which comprises a main body capable of implementing a seal by static contact relative to a first cylindrical element, and a first circumferential lip capable of engaging by friction with a cylindrical surface of a second cylindrical element, said cylindrical elements being substantially coaxial and mounted so as to pivot relative to one another. The main body comprises a front surface configured to be in axial contact with a front surface of the first cylindrical element, the main body comprising a second circumferential lip radially opposite the first circumferential lip and capable of being in radial contact with a cylindrical surface of the first cylindrical element.

20 Claims, 3 Drawing Sheets

Figure 1:
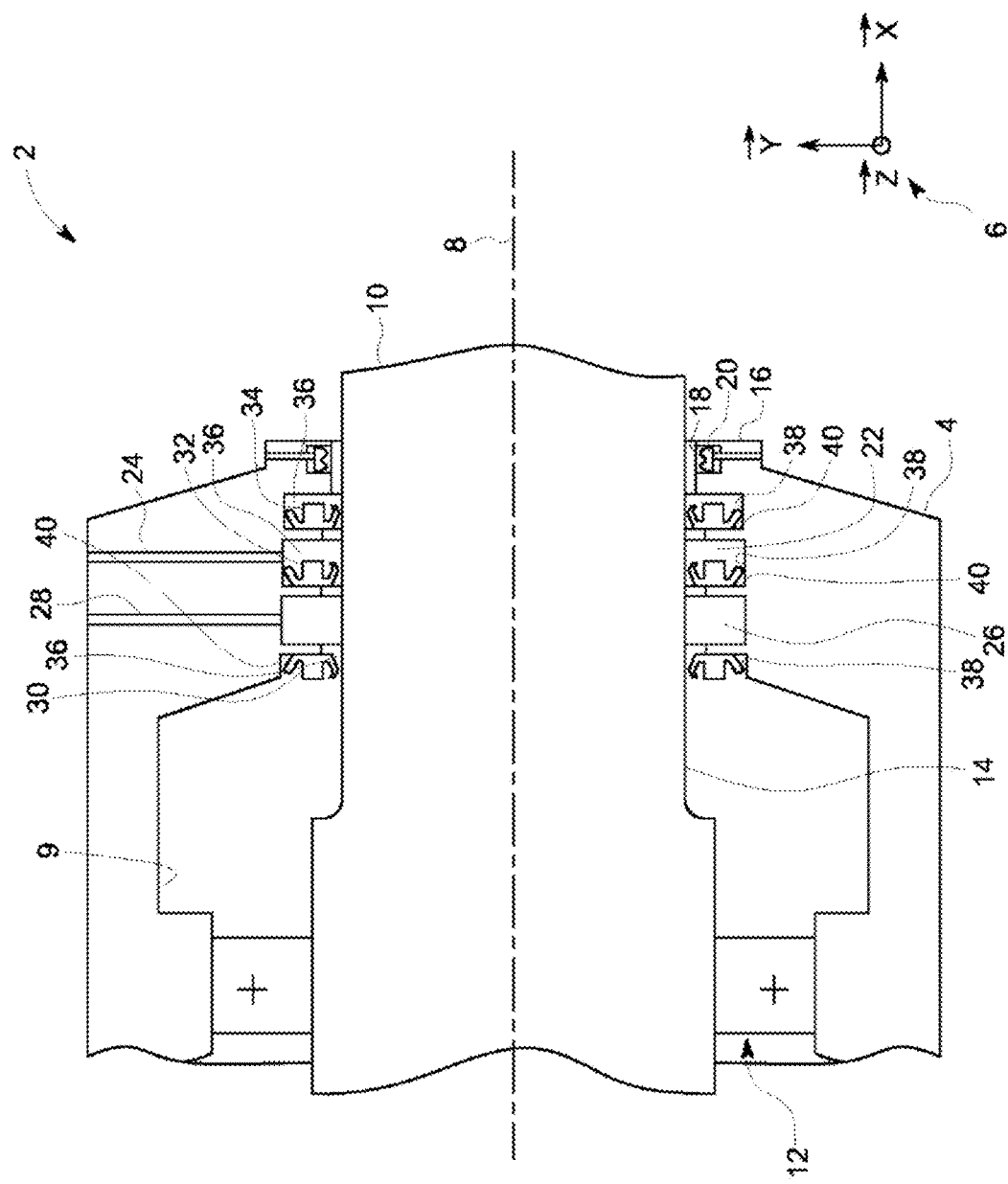

(51) Int. Cl.
*F16J 15/3236* (2016.01)
*F16J 15/00* (2006.01)

(58) Field of Classification Search
CPC .. F16J 15/3272; F16J 15/3276; F16J 15/3232; F16J 15/3236; B63H 23/00; B63H 23/321; B63H 2023/322; B63H 2023/323; B63H 2023/325; B63H 2023/326; B63H 2023/327
USPC .......................................................... 277/558
See application file for complete search history.

(56) References Cited

U.S. PATENT DOCUMENTS

| | | | | |
|---|---|---|---|---|
| H2293 H | * | 9/2014 | Byrd | .............................. 277/576 |
| 2005/0157965 A1 | * | 7/2005 | Bellufi | ................ F16C 33/7886 |
| | | | | 384/486 |

FOREIGN PATENT DOCUMENTS

| | | | |
|---|---|---|---|
| EP | 2199164 | A1 | 6/2010 |
| EP | 2993123 | A1 | 3/2016 |

* cited by examiner

RING SEAL FOR IMPLEMENTING A ROTARY SEAL BETWEEN TWO CYLINDRICAL ELEMENTS

The invention concerns a ring seal intended to provide a seal between two cylindrical elements that are pivotable relative to each other, and an assembly comprising such cylindrical elements and such a ring seal.

Many applications require that a seal be provided between a first cylindrical element and a second cylindrical element, said cylindrical elements being substantially coaxial and mounted pivotably relative to each other.

For example, an oriented propulsion device, also known as a "propulsion oriented device" (POD), comprises a cylindrical structure and a propulsion shaft. The structure is secured to a casing. Shaft bearings are generally provided, producing a pivotal connection between the propulsion shaft and the structure around the axis of the propulsion shaft. To allow lubrication of the shaft bearings, ring seals are arranged axially on either side of the shaft bearings, and radially between the structure and the propulsion shaft.

Conventionally, a ring seal providing a rotary seal between two cylindrical elements comprises a main body and a circumferential lip. The main body is compressed in a housing made in a first cylindrical element. In so doing, the main body is held fixed relative to the first cylindrical element. The circumferential lip comes into dynamic contact with a second cylindrical element. In so doing, the main body implements a static seal with the first cylindrical element and the circumferential lip implements a dynamic seal with the second cylindrical element.

Although such ring seals are in widespread use in multiple applications, they have certain disadvantages.

Indeed, when there is a significant radial offset of the cylindrical elements relative to each other, the circumferential lip can move radially away from the second cylindrical element, causing a defective seal. For example, in the case of a propulsion oriented device for an icebreaking vessel, a significant deformation of the propulsion shaft can occur in the event of an impact between the propulsion oriented device and a block of ice. This deformation causes a radial offset of the propulsion shaft relative to the cylindrical structure. This can result in a leak into the sea of lubricating oil for the shaft bearing, or conversely, a flooding of an interior compartment of the propulsion device.

In view of the foregoing, a purpose of the invention is to improve the rotary seal between two cylindrical elements, particularly in the event of a strong radial offset of the cylindrical elements relative to each other.

To that end, a ring seal is proposed comprising a main body capable of implementing a seal by static contact relative to a first cylindrical element, and a first circumferential lip capable of cooperating by friction with a cylindrical surface of a second cylindrical element, said cylindrical elements being substantially coaxial and mounted pivotably relative to one another.

According to a general feature of this ring seal, the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element.

As a result of the frontal surface being configured in this way, the ring seal defined above can be moved radially relative to the first cylindrical element following a large radial offset of the cylindrical elements relative to one another. In this case, the first circumferential lip continues to ensure a seal by dynamic contact with the second cylindrical element. The second circumferential lip provides a seal by static contact relative to the first cylindrical element. The second circumferential lip tends to re-center the ring seal when the radial offset between the cylindrical elements relative to one another is reduced.

In one particular embodiment, said second circumferential lip is configured to be deformed in response to relatively large variations in a radial offset of the cylindrical elements relative to one another, and the first circumferential lip is configured to be deformed in response to relatively small variations in the radial offset of the cylindrical elements relative to one another.

In this way, it is possible to control the radial displacement of the ring seal relative to the first cylindrical element so that said displacement occurs only when a large radial offset of the cylindrical elements relative to one another takes place.

Furthermore, a first connection portion for connecting the first circumferential lip to the main body and a second connection portion for connecting the second circumferential lip to the main body can be provided, the first connection portion and the second connection portion being substantially axially adjacent relative to one another.

Advantageously, at least one of the first and second connection portions is substantially axially adjacent relative to the frontal surface of the main body.

In the present application, as regards any two objects, when speaking of the two objects "substantially axially adjacent" will be understood as meaning that the two objects are axially offset by an offset representing less than 20% of the width of the ring seal along the axial direction thereof.

Preferably, the first connection portion has a thickness along the axial direction less than the thickness along the axial direction of the second connection portion.

In one embodiment, the seal is produced from polyurethane.

It is also possible for the frontal surface of the main body to be produced from polytetrafluoroethylene.

Thanks to the use of such a design of the connection portions and such materials, the forces of friction that appear between the ring seal and the cylindrical elements, and also the radial forces implemented by the circumferential lips, can be anticipated. Thus, the ring seal can be designed to make a particular circumferential lip work for certain values of radial offset of the cylindrical elements relative to one another.

Advantageously, the main body comprises a recess extending axially inward from the frontal surface and a contact ring received in said recess.

Thus, it is easy to produce a main body comprising a contact surface made of a material with properties different from the material of the ring seal. A seal is easily produced having a material suitable for axial contact and a material suitable for radial contacts.

According to another aspect, an assembly is provided comprising a first cylindrical element and a second cylindrical element that is substantially coaxial and mounted pivotably relative to the first cylindrical element, the first cylindrical element comprising a first cylindrical surface and a frontal surface, the second cylindrical element comprising a second cylindrical surface, said assembly comprising a first seal as previously described.

In one embodiment, the first cylindrical element is a cylindrical structure of a propulsion oriented device for a watercraft, the second cylindrical element being a propulsion shaft of the propulsion oriented device, said second cylindrical element being situated radially inside said first cylindrical element.

Furthermore, a second seal and a third seal as previously described can be provided, said assembly comprising a drainage space axially delimited by the first seal and by the second seal and a buffer space axially delimited by the second seal and by the third seal.

Figure 2:
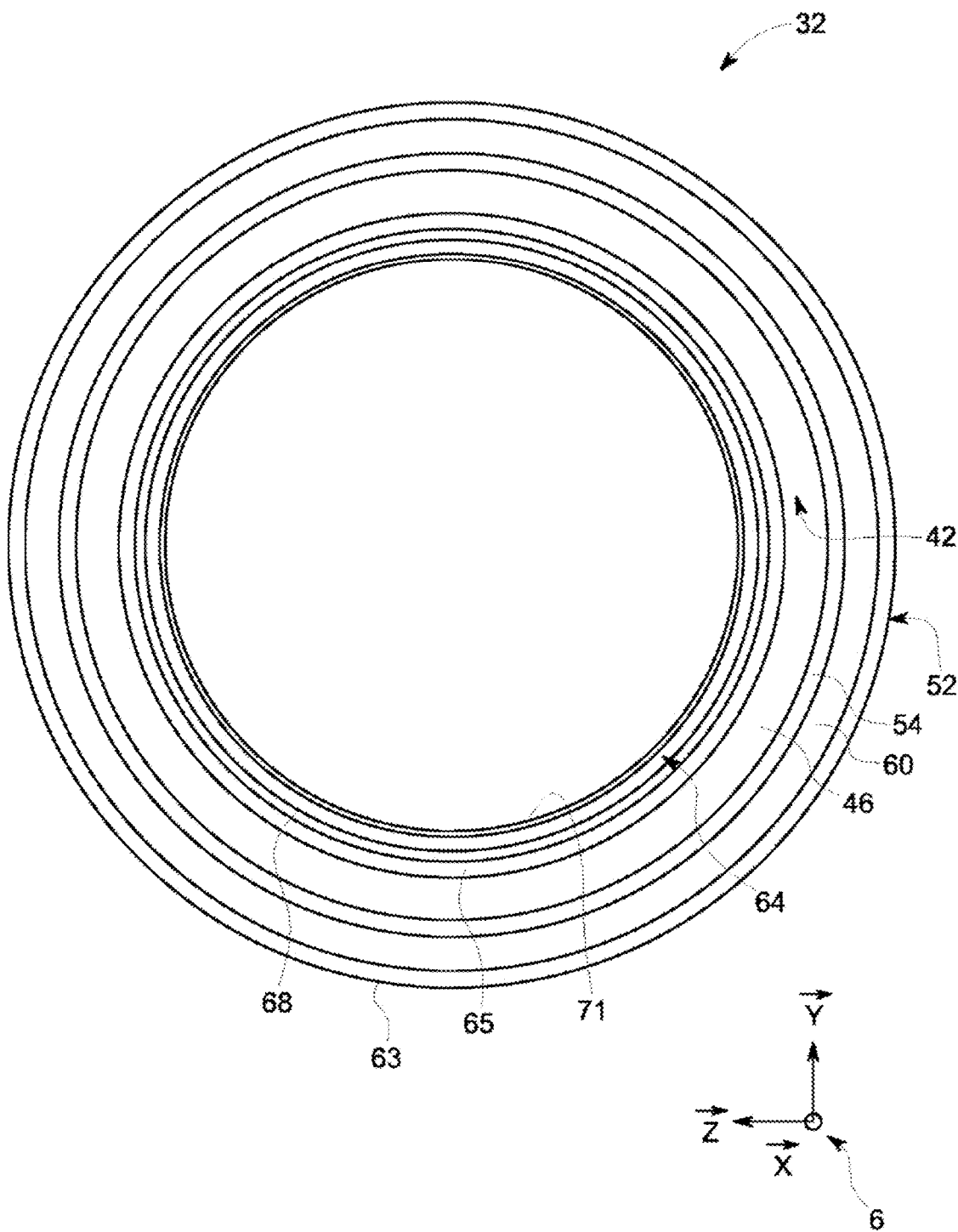
Figure 3:
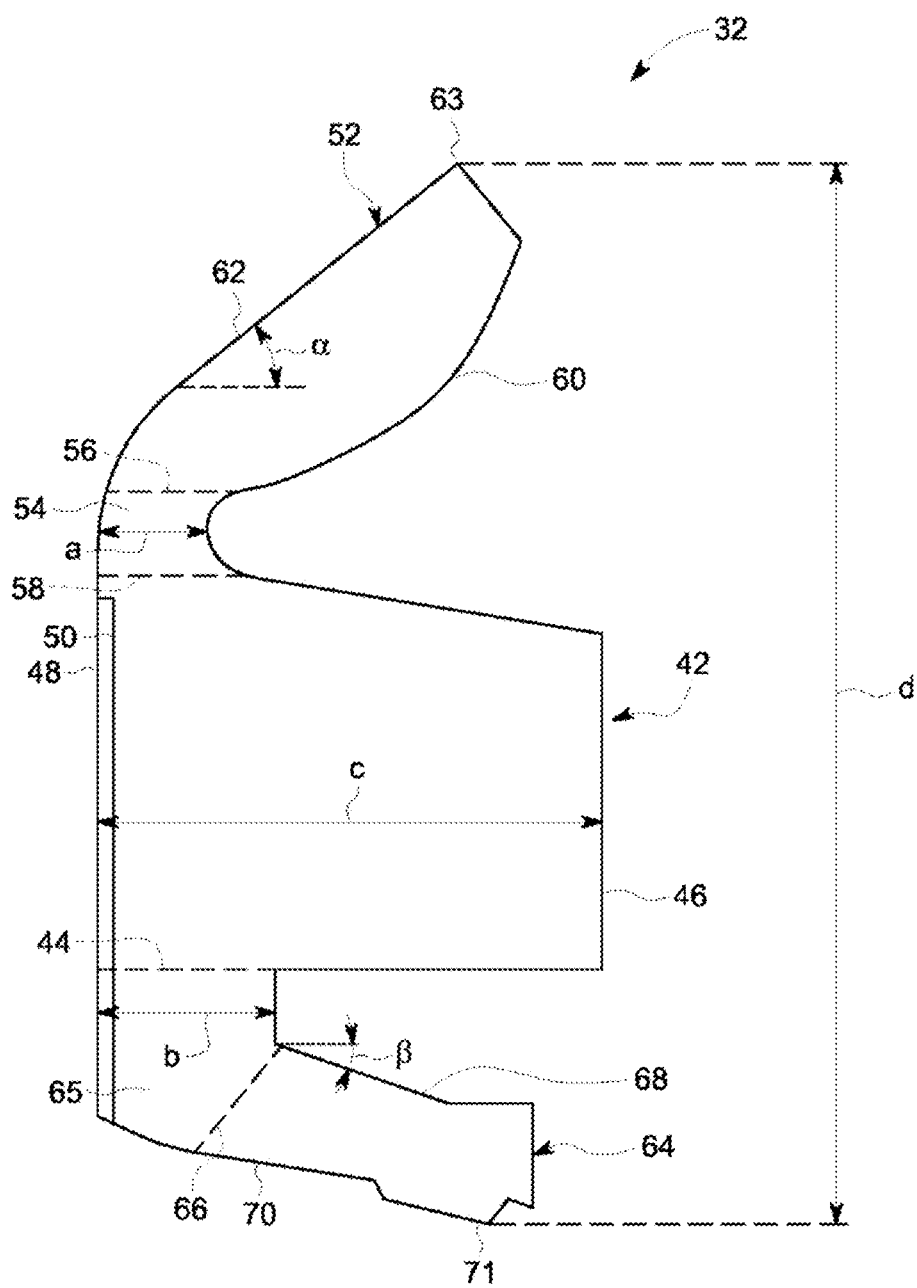
Figure 3:
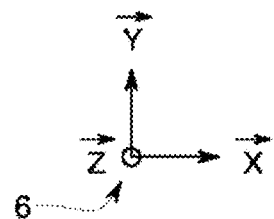

Other purposes, features and advantages of the invention will become apparent from the following description, provided solely by way of non-limiting example, and with reference to the appended drawings, in which:

FIG. 1 shows a radial cross-section of an assembly according to one embodiment of the invention, FIG. 2 shows an axial view of a seal of the assembly of FIG. 1, and FIG. 3 shows a partial cross-section of the seal of FIG. 2.

With reference to FIG. 1, an assembly 2 is schematically represented. The assembly 2 is incorporated in a propulsion oriented device (not shown) that can be mounted on a watercraft such as a ship, a submarine or an oil platform. However, the invention is not limited to these applications. In particular, without going beyond the scope of the invention, such an assembly could be incorporated in a propulsion device, a tidal energy harvesting device or a hydroelectric generating device.

The assembly 2 comprises a cylindrical structure 4 attached to a casing (not shown) of the propulsion oriented device. With reference to FIGS. 1 to 3, an orthonormal vector basis 6 associated with the structure 4 is defined. The basis 6 is composed of a vector $\vec{x}$, of a vector $\vec{y}$; and of a vector $\vec{z}$.

The structure 4 is generally cylindrical relative to an axis of cylindricity 8. The axis is parallel to the vector $\vec{y}$. A bore 9 is made in the interior of the structure 4. The bore 9 is cylindrical around the axis 8.

The assembly 2 further comprises a propulsion shaft 10. The shaft is secured to a propeller (not shown) of the propulsion oriented device. The shaft 10 is mounted in the interior of the bore 9. The shaft 10 is cylindrical in shape. The shaft 10 is arranged relative to the structure 4 such that the axis of cylindricity of the shaft 10 coincides substantially with the axis 8, as in the configuration shown in FIG. 1. However, in different operating situations of the propulsion oriented device, deformations of the shaft 10 may cause a radial offset between the axis of cylindricity of the shaft 10 and the axis 8. Unless indicated otherwise, the expressions "axial" and "radial" will be considered as referring to the axis 8.

The shaft 10 is mechanically coupled to the structure 4 by a pivot connection around the axis 8. To drive the shaft 10 in rotation relative to the structure 4, an electric machine (not shown) is provided comprising a rotor secured to the shaft 10 and a stator secured to the structure 4. To enable the pivotably connected guidance of the shaft 10 relative to the structure 4, a rotary bearing 12 is provided. The bearing 12 can be of the friction type, for example composed of bushes, or roller type, such as a ball bearing, a roller bearing or a taper bearing. Although a single bearing 12 is represented, it will be understood that other rotary bearings can be provided for implementing the mechanical link between the structure 4 and the shaft 10. The bearing 12 is lubricated by a hydraulic fluid (not shown) such as oil or grease.

The shaft 10 is radially delimited by a surface 14. The surface 14 is cylindrical with a circular base around the axis of cylindricity of the shaft 10 (which coincides with the axis 8 in FIG. 1) and diameter $d_{14}$.

The structure 4 is intended to be immersed in seawater. As will be detailed hereinafter, the assembly 2 comprises means for implementing a rotary seal between the structure 4 and the shaft 10. In particular, a seal is implemented to avoid any leakage of the hydraulic fluid lubricating the bearing 12 out of the assembly 2, and to avoid the entry of seawater into the bore 9.

The structure 4 is axially delimited by an end frontal surface 16. A housing 18 is axially located between the surface 16 and the bearing 12. The housing 18 receives a maintenance seal 20. In this instance, the seal 20 is an inflatable seal. The seal 20 is intended to be inflated when maintenance is performed on the assembly 2. To that end, the seal 20 is designed to implement a static seal relative to the surface 14 of the shaft 10 when it is inflated.

The assembly 2 comprises a buffer space 22 axially situated between the housing 18 and the bearing 12. The buffer space 22 is in fluid communication with the exterior of the assembly 2 through a conduit 24. Thanks to the conduit 24, the buffer space 22 can be filled with a buffer fluid (not shown). The buffer fluid makes it possible to ensure safety in the event of failure of the means for implementing the rotary seal of the assembly 2.

The assembly 2 comprises a drainage space 26 axially situated between the buffer space 22 and the bearing 12. The drainage space 26 is in fluid communication with the exterior of the assembly 2 via a conduit 28. The conduit 28 makes it possible to evacuate a fluid that has penetrated into the drainage space 26 due to a failure of the means for implementing the rotary seal of the assembly 2.

The drainage space 26 extends axially between a first ring seal 30 and a second ring seal 32. The drainage space 22 extends axially between the second ring seal 32 and a third ring seal 34. The seals 30, 32 and 34 are substantially identical. The seals 30, 32 and 34 are coaxial relative to the axis 8. The seal 32 is shown in detail in FIGS. 2 and 3. The seals 30, 32 and 34 are principally produced from polyurethane.

The structure 4 comprises three housings 36 respectively provided to receive the seals 30, 32 and 34. In particular, each housing 36 is radially delimited by a cylindrical surface 38 of circular base around the axis 8 and of diameter $d_{38}$ larger than the diameter $d_{14}$. Each housing 36 is axially delimited by a flange 40 extending radially inward from the surface 38. Each flange 40 extends axially between two axial frontal surfaces (not referenced).

Although, in the illustrated example, means for implementing a rotary seal are provided on only one side of the bearing 12, it is obvious that, without going beyond the scope of the invention, identical means axially incorporated on the other side of the bearing 12 can be considered.

In FIGS. 2 and 3, the seal 32 is shown in a rest position. The dimensions of the seal 32 in the figures are not limiting. Moreover, the shape of the seal 32 may be varied under the effect of the contact pressure of the surfaces 14 and 38 and of the pressures exerted by the fluids for which the seal is implemented.

The seal 32 comprises a main body 42. The main body 42 is radially situated on the outside relative to the rest of the seal 32. In FIG. 3, the interior radial limit of the main body 42 is schematically represented by a broken line 44.

The main body 42 is axially delimited by a distal surface 46 and by a frontal proximal surface 48. At the proximal surface 48, the main body 42 comprises a polytetrafluoroethylene ring 50. The ring 50 is received in a recess (not referenced) extending axially towards the interior of the body 42 from the surface 48. The ring 50 is not necessarily radially delimited by the limit 44. In the example shown in FIG. 3, the ring 50 continues to extend radially on the inside of the limit 44. To produce the seal 32, the main body 42 can be overmolded onto the ring 50. Alternatively, the ring 50 can be pressed into the recess made in the main body 42 at the proximal surface 48.

With reference to FIGS. 1 and 3, the seals 30, 32 and 34 are in axial abutment by the proximal surface 48 thereof against a frontal surface of the flange 40 of the respective housing 36 thereof. More precisely, the seal 30 is in contact by the proximal surface 48 thereof against the frontal surface adjacent to the bearing 12 of the flange 40. The seals 32 and 34 are in contact by the respective proximal surface 48 thereof against the opposite frontal surface to the bearing 12 of the respective flange 40. In other words, as can be seen in FIG. 1, the seal 30 is arranged symmetrically to the seals 32 and 34 relative to a plane perpendicular to the axis 8.

With reference to FIGS. 2 and 3, pressure exerted by a fluid, in this instance the buffer fluid of the ring seal 32, is exerted against the distal surface 46 along the direction of the vector $\vec{x}$ and in a direction opposite to that of the vector $\vec{x}$. The result is an axial contact pressure between the proximal surface 48 of the seal 32 and the frontal surface of the flange 40.

The ring seal 32 comprises an external circumferential lip 52. The lip 52 extends radially outwards from the main body 42. The lip 52 is connected to an inner radial portion (not referenced) of the main body 42 by a connection portion 54. The limit between the lip 52 and the connection portion 54 is schematically shown by a broken line 56. The limit between the connection portion 54 and the inner portion of the main body 42 is schematically shown by a broken line 58. The lip 52 extends along an oblique direction forming an angle α relative to the direction of the axis 8. Deformations of the lip 52 enable the angle α to be varied. When it is not deformed by the contact of the surface 62 with the surface 38, the lip 52 is radially delimited by an external circular edge 63 of diameter $d_{63}$. The diameter $d_{63}$ is larger than the diameter $d_{38}$.

The lip 52 is delimited in the direction of the width thereof by an inner surface 60 and an outer surface 62. With reference to FIGS. 1 and 3, the outer surface 62 of the lip 52 is in contact with the surface 38. The same fluid as the one that exerts a pressure on the surface 46, in this instance the buffer fluid of the seal 32, exerts a pressure on the surface 60, which tends to separate the lip 52 from the inner portion of the main body 42. The result is a radial contact pressure between the surface 62 of the lip 52 and the surface 38 of the structure 4.

The ring seal 32 comprises an inner circumferential lip 64 extending radially inward from the main body 42. The lip 64 is connected to the main body 42 by a connection portion 65. The broken line 44 delimits the main body 42 from the connection portion 65. The limit between the lip 64 and the connection portion 65 is schematically shown by a broken line 66. The lip 64 extends along an oblique direction forming an angle β relative to the direction of the axis 8, the angle β being variable in response to deformations of the lip 64. When it is not deformed, the lip 64 is radially delimited by an internal circular edge 71 of diameter $d_{71}$. The diameter $d_{71}$ is smaller than the diameter $d_{14}$.

The lip 64 is delimited in the direction of the width thereof by an outer cylindrical surface 68 and by an inner cylindrical surface 70. With reference to FIGS. 1 and 3, the inner surface 70 of the lip 64 is in contact with the surface 14. As with the lip 52, the buffer fluid exerts a pressure on the surface 68, which tends to separate the lip 64 from the main body 42, thus producing a radial contact pressure between the surface 70 of the lip 64 and the surface 14 of the shaft 10.

The width along the axial direction of the connection portion 54 has been designated by the reference a in FIG. 3. The reference b designates the width along the axial direction of the connection portion 65. More particularly, the references a and b correspond to the minimum thicknesses along the axial direction of the portion 54 and of the portion 65, respectively. The reference c designates the width along the axial direction of the seal 32. The reference d represents the distance along the radial direction between the circular edges 63 and 71.

In the illustrated example, the dimensions a, b and d satisfy the following relationships:
$b = k_1 \cdot a$ with: $1.5 \le k_1 \le 2$
$d = k_2 \cdot a$ with: $9 \le k_2 \le 13$.

Moreover, the dimension c is preferably substantially equal to the length of the longer of the lips 52 and 64, in this instance the lip 52.

In the illustrated example, the dimensions of the seal 32 at rest are as follows:
a=5 mm; b=8.4 mm; c=25 mm and d=55.5 mm.

As a result of choosing such dimensions, there is control over which of the two lips 52 and 64 is deformed in response to a radial offset of the cylindrical shaft 10 relative to the structure 4 based on the value of said radial offset. In this instance, with the selected dimensions and materials, the inner lip 64 is deformed when the radial offset of the shaft 10 relative to the structure 4 is less than 0.5 mm. The lip 52 is deformed for a radial offset of the shaft 10 relative to the structure 4 greater than 0.5 mm. Moreover, because of the choice of the dimension d, the contact surfaces 48 and 62 are wide enough to create an adherence force on the main body 42 greater than the frictional force exerted by the shaft 10 on the lip 64. As a result, the seal 32 is held stationary relative to the structure 4 within speed ranges typical of a propulsion oriented device, without the need to provide an additional device to keep the seal 32 coupled in rotation with the structure 4.

In this way, the seal 32 implements, by the main body 42 thereof, a seal by static contact with the structure 4 and, by the inner circumferential lip 64 thereof, a seal by dynamic contact with the shaft.

When a deformation of the shaft 10 occurs, radially offsetting the shaft 10 relative to the structure 4, the inner lip 64 is deformed when the radial offset is small and the outer lip 52 is deformed when the radial offset is large. In this way, the main body 42 is radially offset when a large radial offset of the shaft 10 occurs relative to the structure 4. The seal implemented by the ring seal 32 continues to be ensured in spite of the large radial offset. The compressed lip 52 stabilizes the seal 32 in the housing 36 thereof. When the shaft 10 returns to its initial shape, and therefore when the radial offset tends to diminish, the outer lip 52 exerts an elastic force on the main body 42, tending to re-center the seal 32 around the axis 8.

In a variant embodiment, the circumferential lip 64 comprises an annular groove (not shown) extending radially towards the interior of the lip 64 from the surface 68. The annular groove receives a retaining ring (not shown) that can be produced from an elastic material. In a variant embodiment, the deformation of the circumferential lip 64 is controlled by the width of the connection portion and by the elasticity and dimensions of the retaining ring.

In view of the foregoing, the invention makes it possible to implement a seal relative to a fluid between two cylindrical elements that pivot relative to one another, said seal being improved particularly in the event of deformation of one of the cylindrical elements, causing a radial offset of one cylindrical element relative to the other.

What is claimed is:

1. A ring seal comprising,
a main body capable of implementing a seal by static contact relative to a first cylindrical element, and
a first circumferential lip capable of cooperating by friction with a cylindrical surface of a second cylindrical element, said cylindrical elements being substantially coaxial and mounted pivotably relative to one another,
wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element.

2. The seal as claimed in claim 1, wherein said second circumferential lip is configured to be deformed in response to relatively large variations in a radial offset of the cylindrical elements relative to one another, and the first circumferential lip is configured to be deformed in response to relatively small variations in the radial offset of the cylindrical elements relative to one another.

3. The seal as claimed in claim 1, comprising a first connection portion for connecting the first circumferential lip to the main body and a second connection portion for connecting the second circumferential lip to the main body, the first connection portion and the second connection portion being substantially axially adjacent relative to one another.

4. The seal as claimed in claim 3, wherein at least one of the first and second connection portions is substantially axially adjacent relative to the frontal surface of the main body.

5. The seal as claimed in claim 3, wherein the first connection portion has a thickness (b) along the axial direction less than a thickness (a) along the axial direction of the second connection portion.

6. The seal as claimed in claim 1, wherein the seal is produced from polyurethane and/or wherein the frontal surface of the main body is produced from polytetrafluoroethylene.

7. The seal as claimed in claim 1, wherein the main body comprises a recess extending axially inward from the frontal surface and a contact ring received in said recess.

8. An assembly comprising a first cylindrical element and a second cylindrical element that is substantially coaxial and mounted pivotably relative to the first cylindrical element, the first cylindrical element comprising a first cylindrical surface and a frontal surface, the second cylindrical element comprising a second cylindrical surface, said assembly comprising a first seal as claimed in claim 1.

9. The assembly as claimed in claim 8, wherein the first cylindrical element is a cylindrical structure of a propulsion oriented device for a watercraft, the second cylindrical element being a propulsion shaft of the propulsion oriented device, said second cylindrical element being situated radially inside said first cylindrical element.

10. The assembly as claimed in claim 8, further comprising a second seal and a third seal, each of the second and the third seal comprising:
a main body capable of implementing a seal by static contact relative to a first cylindrical element, and
a first circumferential lip capable of cooperating by friction with a cylindrical surface of a second cylindrical element, said cylindrical elements being substantially coaxial and mounted pivotably relative to one another,
wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element,
said assembly comprising a drainage space axially delimited by the first seal and by the second seal and a buffer space axially delimited by the second seal and by the third seal.

11. The assembly as claimed in claim 9, further comprising a second seal and a third seal, each of the second and the third seal comprising:
a main body capable of implementing a seal by static contact relative to a first cylindrical element, and
a first circumferential lip capable of cooperating by friction with a cylindrical surface of a second cylindrical element, said cylindrical elements being substantially coaxial and mounted pivotably relative to one another,
wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element,
said assembly comprising a drainage space axially delimited by the first seal and by e second seal and a buffer space axially delimited by the second seal and by the third seal.

12. The seal as claimed in claim 4, wherein the first connection portion has a thickness (b) along the axial direction less than a thickness (a) along the axial direction of the second connection portion.

13. An assembly comprising a first cylindrical element and a second cylindrical element that is substantially coaxial and mounted pivotably relative to the first cylindrical element, the first cylindrical element comprising a first cylindrical surface and a frontal surface, the second cylindrical element comprising a second cylindrical surface, said assembly comprising a first seal as claimed in claim 3.

14. The assembly as claimed in claim 13, wherein the first cylindrical element is a cylindrical structure of a propulsion oriented device for a watercraft, the second cylindrical element being a propulsion shaft of the propulsion oriented device, said second cylindrical element being situated radially inside said first cylindrical element.

15. The assembly as claimed in claim 13, further comprising a second seal and a third seal, each of the second and the third seal comprising:
a main body capable of implementing a seal by static contact relative to a first cylindrical element, and
a first circumferential lip capable of cooperating by friction with a cylindrical surface of a second cylindrical element, said cylindrical elements being substantially coaxial and mounted pivotably relative to one another, wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element, said assembly comprising a drainage space axially delimited by the first seal and by the second seal and a buffer space axially delimited by the second seal and by the third seal.

16. The assembly as claimed in claim 14, further comprising a second seal and a third seal, each of the second and the third seal comprising:
- a main body capable of implementing a seal by static contact relative to a first cylindrical element, and
- a first circumferential lip capable of cooperating by friction with a cylindrical surface of a second cylindrical element, said cylindrical elements being substantially coaxial and mounted pivotably relative to one another,
- wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element,
- said assembly comprising a drainage space axially delimited by the first seal and by e second seal and a buffer space axially delimited by the second seal and by the third seal.

17. An assembly comprising a first cylindrical element and a second cylindrical element that is substantially coaxial and mounted pivotably relative to the first cylindrical element, the first cylindrical element comprising a first cylindrical surface and a frontal surface, the second cylindrical element comprising a second cylindrical surface, said assembly comprising a first seal as claimed in claim 4.

18. The assembly as claimed in claim 17, wherein the first cylindrical element is a cylindrical structure of a propulsion oriented device for a watercraft, the second cylindrical element being a propulsion shaft of the propulsion oriented device, said second cylindrical element being situated radially inside said first cylindrical element.

19. The assembly as claimed in claim 17, further comprising a second seal and a third seal, each of the second and the third seal comprising:
- a main body capable of implementing a seal by static contact relative to a first cylindrical element, and
- a first circumferential lip capable of cooperating by friction with a cylindrical surface of a second cylindrical element, said cylindrical elements being substantially coaxial and mounted pivotably relative to one another,
- wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element,
- said assembly comprising a drainage space axially delimited by the first seal and by the second seal and a buffer space axially delimited by the second seal and by the third seal.

20. The assembly as claimed in claim 18, further comprising a second seal and a third seal, each of the second and the third seal comprising:
- a main body capable of implementing a seal by static contact relative to a first cylindrical element, and
- a first circumferential lip capable of cooperating by friction with a cylindrical surface of a second cylindrical element, said cylindrical elements being substantially coaxial and mounted pivotably relative to one another,
- wherein the main body comprises a frontal surface configured to be in axial contact with a frontal surface of the first cylindrical element, the main body comprising a second circumferential lip radially opposite to the first circumferential lip and capable of being in radial contact with a cylindrical surface of the first cylindrical element,
- said assembly comprising a drainage space axially delimited by the first seal and by the second seal and a buffer space axially delimited by the second seal and by the third seal.

* * * * *